H. A. Chapin.
Tapping Gas Fittings.
No. 419.
Reissued Dec. 23, 1856.
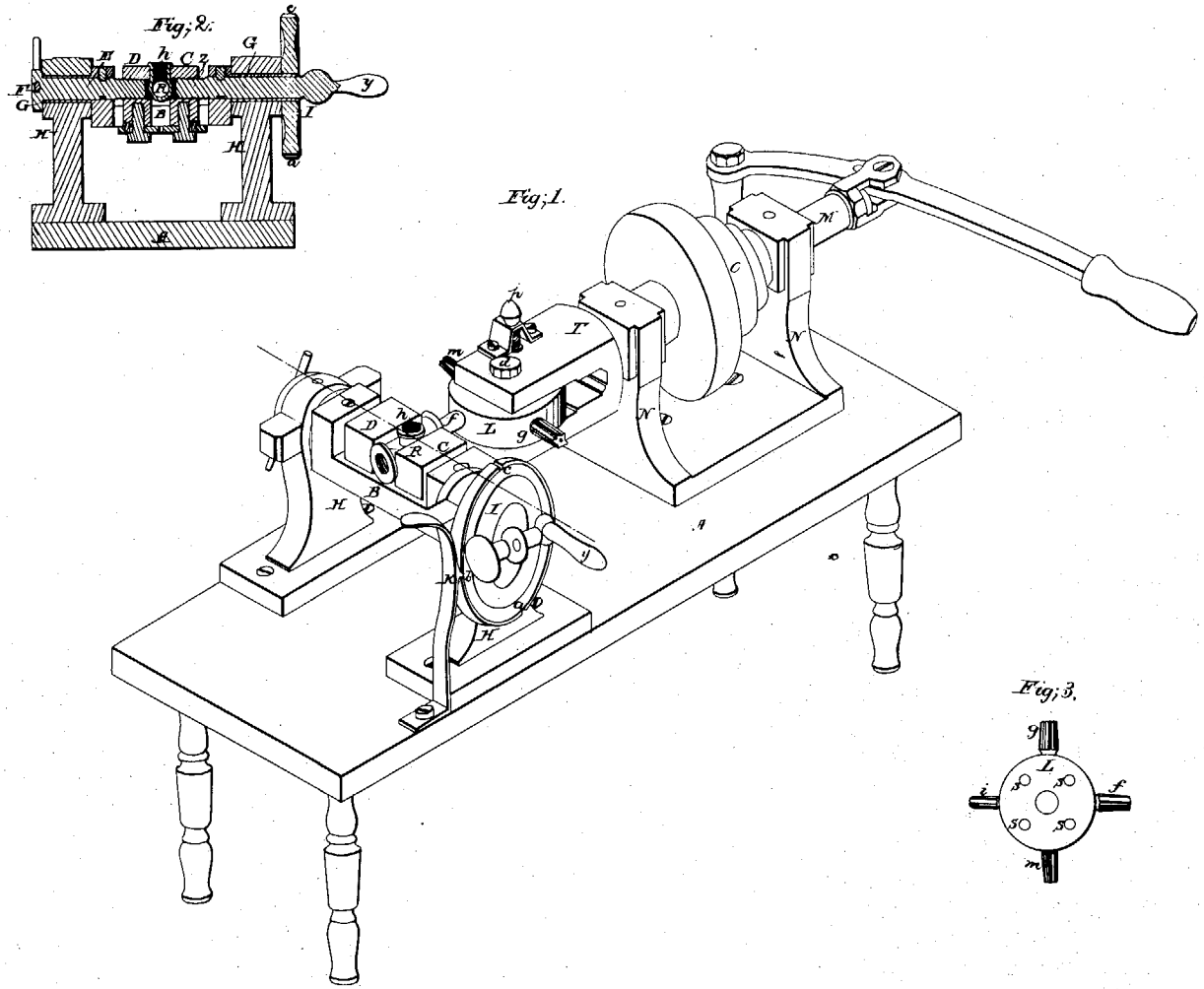

UNITED STATES PATENT OFFICE

HENRY A. CHAPIN, OF SPRINGFIELD, MASSACHUSETT

IMPROVED MACHINE FOR REAMING AND TAPPING GAS-FITTINGS.

Specification forming part of Letters Patent No. 15,219, dated July 1, 1856; Reissue No. 419, dated December 23, 1856.

*To all whom it may concern:*

Be it known that I, HENRY A. CHAPIN, of Springfield, in the county of Hampden and State of Massachusetts, have invented certain Improvements in Machines for Reaming Out and Tapping Gas and Steam Fittings and other Similar Work, of which the following is a full, clear, and exact description, reference being had to the annexed drawings, making part of this specification, in which—

Figure 1 is a perspective view of my machine; Fig. 2, a vertical section through the clamp which holds the fitting; Fig. 3, a view of the tap-holder, which will be more particularly referred to hereinafter.

My invention consists in the employment of a tool-holder armed with its complement of bits or tools, and capable of being turned upon an axis in jaws upon the end of the revolving spindle which carries it, the axis of rotation of the tool-holder being at right angles to the axis of revolution of the spindle, so that any one of the tools may be brought into line with the spindle and made to revolve therewith.

My invention also consists in the employment, in combination with the above, of a rotary chuck or clamp for holding the fittings, the whole being so arranged that the various reaming-tools and taps may be brought to bear as required upon the fittings without removing either the tools or the fittings from the lathe, as will be hereinafter more fully explained.

In the accompanying drawings, A is the bed of the machine, to which the operating parts are secured; L, the tool-holder, in which are secured the reaming-tools *f i* and taps *g m*. This holder is hung within the forked end T of the shaft M, and may be turned upon a pin, *d*, so as to bring any one of the reaming tools or taps in line with the shaft. The holder is held in the required position by the spring-bolt *p*, which enters one or other of the holes *s*. The shaft M revolves in the standards N, and is driven by power applied to the pulleys O, which are connected with the shaft by a spline, so as to allow it to move longitudinally through them, and at the same time to rotate therewith, the band which operates the pulleys being so arranged that the direction of its motion may be instantly reversed by means of an ordinary shipper-lever or otherwise. The handle P is pivoted at one end to the machine, and is connected with the shaft M, so that by means of this handle the shaft may be run in and out, as required, to bring the tools up to their work or to withdraw them therefrom.

B is the clamp or chuck, in which is secured the gas-fitting or other article to be operated upon. This clamp is provided with movable jaws, one of which, D, Fig. 2, is adjusted by the hand-wheel F and screw E, so as to bring the center of the fitting into the proper position, the other, C, being moved, as required, to and from the other by the handle *y* upon the screw *z*. The clamp B is provided with hollow gudgeons G, which rest in bearings in the standards H, and through the center of which pass the clamp-screws E and *z*.

To one of the gudgeons G is secured the wheel I, into the notches *a b c* of which the spring-bolt K enters, by which means the clamp may be secured in the required position to bring one or other of the ends of the fitting in line with the shaft M.

Operation: The axes of the shafts G and M being arranged at the same height above the table A, the jaw D is adjusted so as to bring the center of the fitting R within the axis of the shaft M, and the fitting is clamped, as seen in the drawings, by bringing up the jaw C. When once adjusted, the jaw D does not require to be changed until a fitting of a different size is to be operated upon. The fitting being clamped in the position shown in Fig. 1, the holder L is turned so as to bring the large reamer *f* in line with the center of the fitting. The shaft M is then made to revolve, and the reamer is brought up to its work by the hand-lever P. After the opening in the fitting is suitably enlarged, the holder is revolved upon its axis *d*, and the large tap *g* is brought up, by which one of the female screws in the "run" is formed. The tap is then withdrawn by reversing the motion of the band which drives the pulley O, and the fitting is revolved one hundred and eighty degrees, so as to bring its opposite end into position to be operated upon by the same tools. The fitting is then turned so as to bring the "outlet" *h* opposite to the tool-holder, and the smaller reamer *i* is brought up. Then the corresponding tap, *m*, and the three screws are completed. By the use of this machine a much larger amount of work may be accomplished than has been found practicable by means heretofore employed for the purpose, while the work is done with an accuracy entirely unattainable by the hand process.

I do not claim a tool-holder which can turn independently of the jaws which hold it, as in a shoe-maker's punch; nor do I claim a revolving tool-holder capable of holding and operating a variety of tools one at a time, as in an ordinary bit-stock; but What I do claim as my invention, and desire to secure by Letters Patent, is—

1. The combination of the tool-holder with its spindle, when the said tool-holder is armed with its complement of bits or tools, and is capable of being turned upon an axis at right angles to and independent of the axis of the spindle, so that either tool may be revolved in the axis of the spindle, substantially in the manner and for the purpose described.

2. The rotating tool-holder as constructed, and operating in combination with the revolving chuck or clamp B, for holding the fitting, the whole being arranged in the manner substantially as herein set forth, for the purpose described.

HENRY A. CHAPIN.

Witnesses:
R. B. HILDRETH,
GEO. DWIGHT.